United States Patent [19]
Kirton et al.

[11] 3,852,465

[45] Dec. 3, 1974

[54] ABORTION BY MYOMETRIAL ADMINISTRATION OF PROSTAGLANDINS

[75] Inventors: Kenneth T. Kirton, Oshtemo; Edward M. Southern, Kalamazoo, both of Mich.

[73] Assignee: The Upjohn Company, Kalamazoo, Mich.

[22] Filed: Aug. 16, 1973

[21] Appl. No.: 389,000

Related U.S. Application Data

[63] Continuation-in-part of Ser. No. 291,110, Sept. 21, 1972, abandoned.

[52] U.S. Cl. .............................. 424/305, 424/318
[51] Int. Cl. ............................................ A61k 27/00
[58] Field of Search ........................... 424/305, 318

[56] References Cited

OTHER PUBLICATIONS

Bygdeman et al., Annals of N.Y. Acad. Sci., Vol. 180, (April 30, 1971) pages 473 & 474.

*Primary Examiner*—Sam Rosen

[57] ABSTRACT

Pharmaceutical preparations of abortifacient PGE-type and PGF-type prostaglandins for injection directly into the uterine muscle of pregnant female mammals, including humans, and accomplishing a medical abortion. Methods of administration of the pharmaceutical preparations into the myometrial muscular tissue of the uterus during gestation to accomplish medical abortions.

8 Claims, No Drawings

ABORTION BY MYOMETRIAL ADMINISTRATION OF PROSTAGLANDINS

CROSS REFERENCE TO RELATED APPLICATIONS

This is a continuation-in-part of application Ser. No. 291,110, filed Sept. 21, 1972, now abandoned.

BACKGROUND OF THE INVENTION

Both manufactured prostaglandins and isolated natural prostaglandins are known to those of ordinary skill in the art to which this subject matter pertains. The prostaglandins are related to prostanoic acid, otherwise 7-[(2β-octyl)-cyclopent-1α-yl]-heptanoic acid, corresponding to the structure

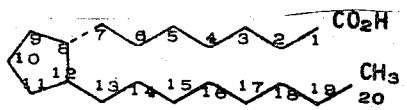

PGE-type prostaglandins are characterized by the presence of a keto group at the 9-position in contrast to the PGF-types which have a hydroxyl group at the 9-position.

PGE compounds are described in U.S. Pat. Nos. 3,290,266 and 3,296,091. PGE$_1$ is 11α, 15(S)-dihydroxy-9-oxo-13-trans-prostenoic acid whereas PGE$_2$ is 11α, 15(S)-dihydroxy-9-oxo-5-cis, 13-trans, prostadienoic acid. PGE$_1$ is converted to dihydro-PGE$_1$ by catalytic hydrogenation as described in Belgian Pat. No. 685,516. Various other members of PGE-types are known and are named either in relationship to PGE or systematically.

PGF compounds are described in British Pat. No. 85,827 and Acta Chemica Scandinavica 14,1693 (1960). Microbiological conversions of unsaturated fatty acids with mammalian glandular tissue are described in U.S. Pat. Nos. 3,290,226 and 3,296,091. For example PGF$_{1α}$ is designated 7-[3α, 5α-dihydroxy-2-(3-hydroxy-1-octyl)-cyclopentyl]-5-heptenoic acid. Likewise, other PGF-types are known and are named as are the PGE-types. For example, see Biochimica and Biophysica Acta, 84,707 (1964) wherein preparation details are described. Also, see Rec. Trav. Chim. 85,1233 (1966) and ibid; 87,461 (1968).

An excellent summary of nomenclature and references to details of preparation and properties is that by Ramwell, et al., in *Progress in the Chemistry of Fats and Other Lipids*, Vol. 9, Part 2, edited by R. Holman, pp. 231–273, Pergamon Press, Oxford, 1968.

Pharmaceutically acceptable salts of these PG compounds, for example, those of alkali metals and alkaline earth bases, such as the sodium, potassium, calcium and magnesium salts; those of ammonia or a basic amine such as mono-, di-, and triethyl amines, benzylamine, heterocyclic amines such as piperidine and morpholine, and amines containing water-solubilizing or hydrophilic groups such as triethanolamine, tris (hydroxymethyl) aminomethane, and phenylmonoethanolamine are disclosed, inter alia, in U.S. Pat. No. 3,069,322, U.S. Pat. No. 3,598,858, and British Pat. no. 1,040,544. Carboxylate esters such as methyl, ethyl, butyl, cyclohexyl, heptyl, octyl, and the isomeric forms thereof wherein the esterifying radical has one to eight carbon atoms, especially one to four carbon atoms, are formed by the usual methods, e.g., reaction with diazomethane or similar diazohydrocarbons as in U.S. Pat. No. 3,069,322, U.S. Pat. No. 3,598,858 and British Pat. No. 1,040,544. Acylates of lower alkanoic acids of one to eight carbon atoms, inclusive are prepared in the usual manner by reaction of the respective prostaglandin acids. See Great Britain No. 1,040,544.

Biological studies of the prostaglandins, for example, actions on smooth muscle, reproductive system, nervous system, cardiovascular system, and relationship to lipid and carbohydrate metabolism, and miscellaneous effects are summarized by Bergstrom et al.; "The Prostaglandins: A Family of Biologically Active Lipids," Pharmacological Reviews, Vol. 20, No. 1, p. 1 et sequitur, March, 1968, the Williams and Wilkins Company, and the extensive references cited therein. Further biological studies are included in the following references: Bygdeman (1964) Acta. Physiol. Scand. 63, (suppl. 242), 1; Pickles and Hall (1963) J. Reprod. Fert. 6, 315 and Sandberg et al. (1965) Acta. Obstet. Gynec. Scand. 44, 585. Also Karim, S. M. M. (1966) J. Obstet, Gynaec. Brit. Cwlth. 73, 903; Karim and Devlin (1967) ibid., 230; and Wiqvist et al., Am. J. Obstet, Gyn. 102, 327–332 (1968). Karim has published the use of PGF$_{2α}$ regarding therapeutic abortion in humans, Lancet, 1:157 (1970) and also the use of PGE$_2$ for therapeutic abortion, British Medical Journal, 1970, 3, 198–200. The state of the art reflected in the aforesaid patents and publications indicates that the PGE and PGF-type prostaglandins will terminate pregnancy in a number of mammalian species, including humans, when administered, inter alia, intramuscularly, intravenously, vaginally, into the lumen of the uterus, into the amniotic sac or orally.

It is against this background that the present invention has been conceived and embodied.

SUMMARY OF THE INVENTION

This invention provides pharmaceutical preparations in dosage unit form for injection directly into the muscular tissue of the pregnant uterus of mammals, including humans and valuable warm-blooded animals such as monkeys, dogs, and horses. This invention also provides a method of accomplishing a medical abortion.

More specifically, this invention comprises a method of inducing a medical abortion in a gestating mammal which consists essentially of administering via the myometrial route a sterile pharmaceutical dosage form supplying an effective nontoxic amount for inducing the abortion of an abortifacient prostaglandin selected from the group consisting of the free acids, pharmaceutically acceptable salts, and carboxylate esters wherein the esterifying radical has one to eight carbon atoms, inclusive, said prostaglandin being compounded with pharmaceutical means which adapt the form for myometrial injection, said dosage form containing an amount of said member designated to provide to said mammal from about 0.001 mg. to about 5 mg./kilo of body weight of said mammal.

An abortifacient prostaglandin is one which will cause an abortion when administered by one or more of the known routes of administration to a pregnant mammal, including pregnant women, cattle, and monkeys. A standard experimental mammal for determining whether or not a prostaglandin is abortifacient is the golden hamster. To determine the abortifacient nature of a prostaglandin, a solution of the prostaglandin is prepared by dissolving it in ethanol (0.05 ml. of ethanol per mg. of the compound), and then diluting that solution with physiological saline until 0.5 ml. of the resulting solution contains the desired amount of compound. The solution is then administered subcutaneously in a single 0.5 ml. injection to each of eight pregnant female golden hamsters at day 4 of pregnancy. On day 8, each animal is sacrificed by cervical dislocation, the uterus is exposed, and the presence or absence of implantation sites is observed in both uterine horns. By this procedure, control animals (vehicle only) usually show 12 to 14 implantation sites.

Using the above procedure, it is simple to determine whether or not a prostaglandin has abortifacient properties since if fewer implantation sites are observed after administration of the prostaglandin than in the control animals, the compound is an abortifacient. By this procedure, the prostaglandin named above as $PGE_2$ causes substantially complete inhibition of pregnancy (no implantation sites in at least seven of the eight animals) at a 200 to 250 microgram dose level.

It is preferred for the purposes of the present invention that the prostaglandin used be at least as effective in the hamster pregnancy test as $PGE_2$. It is, however, even more preferred that the abortifacient prostaglandin be at least 10 times more potent than $PGE_2$ and more desirably at least 100 times more potent than $PGE_2$ in the hamster pregnancy test. Any prostaglandin, however, which includes the optically active naturally-occurring prostaglandins, their racemates, and prostaglandin analogs, including pharmacologically acceptable salts, esters, and acylates thereof as above exemplified, which is abortifacient according to the hamster pregnancy test can be used for the purposes of this invention, and it is such a prostaglandin which is defined herein as an abortifacient prostaglandin.

Especially preferred for the purposes of this invention are the abortifacient prostaglandins within the scope of the formula:

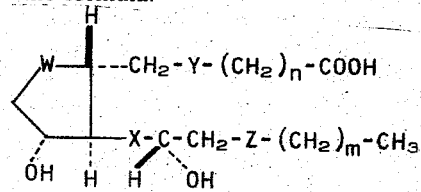

wherein W is =C=O or

X is —$CH_2CH_2$— or trans—CH=CH and both Y and Z are —$CH_2CH_2$; or X is trans—CH=CH, Y is cis—CH=CH and Z is —$CH_2CH_2$—or cis—CH=CH; m is 0, 1, 2, or 3, and n is 2, 3, 4, or 5.

Examples of other prostaglandins of the $PGF\alpha$ -type and the PGE-type which are abortifacient according to the abovedescribed hamster pregnancy test and useful in this invention are 15-methyl-$PGE_1$, 15-methyl-$PGF_{1\alpha}$, 15-methyl-$PGE_2$, 15-methyl-$PGF_{2\alpha}$, 16,16-dimethyl-$PGE_1$, 16,16-dimethyl-$PGF_{1\alpha}$, 16,16-dimethylPGE$_2$, 16,16-dimethyl-$PGF_{2\alpha}$, 20-ethyl-$PGE_2$, 20-ethyl-$PGF_{2\alpha}$, 16-fluoro-$PGE_2$, 16-fluoro-$PGF_{2\alpha}$, $PGE_2$-15-methyl ether, and the above-exemplified salts and esters of those. As examples of prior art which disclose these E-type and F-type prostaglandin-like compounds and others of the E-type and F-type see German Offenlegungschrift Nos. 1,937,675, 1,937,921, 2,011,969, 2,036,471, 2,118,686, 2,121,980, 2,144,048, 2,150,361, 2,154,309, 2,165,184, 2,209,990, 2,217,044, and 2,221,443. See also French Pat. No. 2,119,855, Dutch Pat. application No. 7,206,316, and Belgian Pat. Nos. 779,898 and 782,822, these being available in printed form through Derwent CPI accession Nos. 76213T-B, 76383T-B, 59033T-B, and 72340T-B, respectively. See also U.S. Pat. No. 3,296,091; Belgian Pat. Nos. 736,728 and 747,348; Rec. Trav. Chem. 85, 1233 (1966), ibid. 87, 461 (1968); J. Am. Chem. Soc. 90, 5895 (1968); ibid. 91, 5364 (1969); ibid. 91, 5373 (1969); Chem. Communications, 302 (1969); ibid. 602 (1970).

DESCRIPTION OF THE PREFERRED EMBODIMENTS

Prostaglandins have been shown to terminate pregnancy in a number of different species, when administered intravenously, vaginally, into the uterine lumen, amniotic sac, or orally. The nature of the present invention is a novel drug delivery system consisting of injection of the abortifacient prostaglandin, as above defined, directly into the uterine muscle (myometrium). The prostaglandin is administered as a solution, or suspension. The solution is preferably aqueous, and may or may not be chemically buffered at a physiological pH. Combinations of the prostaglandins and racemic mixtures can be used.

The dosage of prostaglandin varies with the stage of gestation, the compound used, and the species of mammal treated. A minimal effective dose of as low as 0.01 mg/kg. is especially effective in humans, when given at a stage of gestation that is especially sensitive to prostaglandin stimulated uterine contractility. A dose as high as 5 mg./kg. might be required at some other stages of pregnancy and with compounds that are less potent.

The compound may be administered only once, or may be given repeatedly several times a day for several days to complete termination of the pregnancy. The regimen of drug administration is initiated at any time that the uterine muscle is located for injection. Drug is administered trans-abdominally or intra-cervically, depending on the stage of pregnancy and species being treated. The drug is also administered in non-aqueous vehicles such as dimethylacetamide, cottonseed or peanut oil, or in other aqueous vehicles containing for example dimethylacetamide, polyethylene glycol, propylene glycol, or ethanol. These vehicles containing water, oil, the glycols or ethanol constitute pharmaceutical means which adapt the preparation for myometrial injection.

Prostaglandin $F_{2\alpha}$, for example, is effective as an abortifacient in primates (rhesus monkeys) when injected as an aqueous solution into the myometrium. When given as a single injection of 1 mg. trans-abdominally, pregnancy is terminated. Uterine contractility is stimulated rapidly, within 1 minute, and continues for a number of hours (1–5). The animals used in these experiments are all mature rhesus monkeys, 5–7 kg. body wt, and treated during the late second trimester or early third trimester of pregnancy.

Ease of administration is the primary advantage of this method over conventionally used delivery systems. the injection is possible in very early stages of pregnancy, when other conventional methods, intraamniotic or extraovular, are not possible.

Like beneficial results are obtained in terminating pregnancy by medical abortion in other species such as humans, cattle, and dogs using the other abortafacient PGE and PGF-type prostaglandins as above defined.

For medical abortion in a human at about 14 weeks or longer into the gestation period injection is preferably carried out into the myometrium of the uterus via the transabdominal route. For times of gestation from onset to about 14 weeks the uterine cervix is the preferable site of injection, i.e., intra-cervically into the myometrium.

We claim:

1. A method of accomplishing a medical abortion in a gestating mammal consisting essentially of administering into the myometrial muscle a sterile pharmaceutical dosage form for myometrial injection consisting essentially of an effective non-toxic amount for accomplishing said abortion of an abortifacient prostaglandin.

2. A method according to claim 1 wherein said mammal is a human during the first third of the gestation period.

3. A method according to claim 2 wherein said prostaglandin is a member selected from the group consisting of the free acids, pharmaceutically acceptable salts, acylates wherein the acyl radical is that of a lower alkanoic acid having one to eight carbon atoms, inclusive, and carboxylate esters wherein the esterifying radical is alkyl of one to eight carbon atoms, inclusive, of a compound represented by the formula

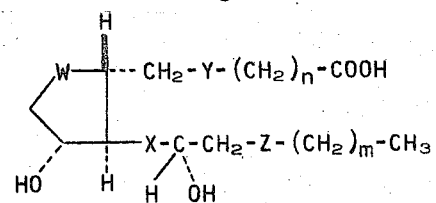

wherein W is =C=O or

X is $-CH_2CH_2-$ or trans$-CH=CH$ and both Y and Z are $-CH_2CH_2-$; X is trans$-CH=CH$, Y is cis$-CH=CH$ and Z is $-CH_2CH_2-$ or cis$-CH=CH$; $m$ is 0, 1, 2, or 3 and $n$ is 2, 3, 4, or 5.

4. A method according to claim 3 wherein said member is $PGE_2$ or a salt thereof.

5. A method according to claim 3 wherein said member is $PGF_{2\alpha}$ or a salt thereof.

6. A method according to claim 2 wherein the prostaglandin has a potency in the golden hamster pregnancy test at least equal to that of $PGE_2$.

7. A method according to claim 2 wherein the prostaglandin has a potency in the golden hamster pregnancy test at least 10 times that of $PGE_2$.

8. A method according to claim 2 wherein the prostaglandin has a potency in the golden hamster pregnancy test at least 100 times that of $PGE_2$.

* * * * *

UNITED STATES PATENT OFFICE
CERTIFICATE OF CORRECTION

Patent No. 3,852,465     Dated December 3, 1974

Inventor(s) Kenneth T. Kirton and Edward M. Southern

It is certified that error appears in the above-identified patent and that said Letters Patent are hereby corrected as shown below:

Column 6, lines 17-18, "m is 0. 1, 2, or 3" should read -- m is 0, 1, 2, or 3 --.

Signed and Sealed this ninth Day of August 1977

[SEAL]

Attest:

RUTH C. MASON
*Attesting Officer*

C. MARSHALL DANN
*Commissioner of Patents and Trademarks*